United States Patent
Liu

(10) Patent No.: US 12,481,190 B2
(45) Date of Patent: Nov. 25, 2025

(54) ARRAY SUBSTRATE AND DISPLAY PANEL

(71) Applicant: TCL CHINA STAR OPTOELECTRONICS TECHNOLOGY CO., LTD., Shenzhen (CN)

(72) Inventor: Jinming Liu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 239 days.

(21) Appl. No.: 18/211,273

(22) Filed: Jun. 18, 2023

(65) Prior Publication Data

US 2024/0347547 A1    Oct. 17, 2024

(30) Foreign Application Priority Data

Apr. 13, 2023 (CN) .......................... 202310422560.5

(51) Int. Cl.
*G02F 1/1362* (2006.01)
(52) U.S. Cl.
CPC .. *G02F 1/136218* (2021.01); *G02F 1/136222* (2021.01); *G02F 1/136286* (2013.01)
(58) Field of Classification Search
CPC ... G02F 2001/136218; G02F 1/136218; G02F 1/136222; G02F 1/136286; G02F 1/134372; H01L 29/78633
See application file for complete search history.

(56) References Cited

U.S. PATENT DOCUMENTS

2009/0268145 A1* 10/2009 Anjo ................... H10D 86/421
                                                                 349/147
2022/0050342 A1*  2/2022 Lin ....................... G02F 1/1362

FOREIGN PATENT DOCUMENTS

CN            110879499 A  *  3/2020  ........... G02F 1/1333

* cited by examiner

*Primary Examiner* — Jia X Pan
(74) *Attorney, Agent, or Firm* — The Roy Gross Law Firm, LLC; Roy D. Gross

(57) ABSTRACT

The present application provides an array substrate and a display panel. The array substrate includes a substrate, a common signal line disposed on the substrate, a data line disposed on a side of the common signal line facing away from the substrate, a pixel electrode and a connection electrode spaced from each other and disposed on a side of the data line facing away from the common signal; and a transparent shielding electrode located between the data line and the pixel electrode. The transparent shielding electrode is connected to the common signal line via a first through-hole, the connection electrode is connected to the transparent shielding electrode via a second through-hole, in a plan view of the array substrate, the first through-hole is located within a region of the pixel electrode and the second through-hole is located within a region of the connection electrode.

20 Claims, 9 Drawing Sheets

ARRAY SUBSTRATE AND DISPLAY PANEL

CROSS-REFERENCE TO RELATED APPLICATIONS

This application claims priority to and the benefit of Chinese Patent Application No. 202310422560.5 filed on Apr. 13, 2023. The disclosure of the aforementioned application is incorporated herein by reference in its entirety.

TECHNICAL FIELD

The present application relates to the field of display technologies, and particularly to an array substrate and a display panel.

BACKGROUND

In a TSS (Transparent Storage Capacity and Shielding Layer) pixel structure of a display panel, a TSS transparent electrode layer is used to replace DBS (data line BM less) electrode, in a plan view, the TSS transparent electrode layer overlaps with data lines to shield the electric field generated by the data lines. Additionally, a transparent storage capacity with a great capacitance is formed of the TSS transparent electrode layer and a pixel electrode layer, which greatly improves transmittance and storage capacitance of the display panel. However, in the TSS pixel structure, the TSS transparent electrode layer is connected to a metal layer including the pixel electrode via a deep hole, and is connected to the common signal line via a shallow hole. However, an undercut may be formed during the processes of communicating the deep hole with the shallow hole, which may cause disconnection of traces.

SUMMARY

In view of this, an array substrate and a display panel are provided

An array substrate provided by the present application includes:
  a substrate;
  a first metal layer disposed on the substrate and including a common signal line;
  a second metal layer disposed on a side of the first metal layer facing away from the substrate and including a data line;
  an electrode layer disposed on a side of the second metal layer facing away from the first metal layer and including a pixel electrode and a connection electrode spaced from each other; and
  a shielding layer located between the second metal layer and the electrode layer and including a transparent shielding electrode;
  the transparent shielding electrode is connected to the common signal line via a first through-hole, the connection electrode is connected to the transparent shielding electrode via a second through-hole, the first through-hole and the second through-hole are spaced from each other, in a plan view of the array substrate, the first through-hole is located within a region of the pixel electrode and the second through-hole is located within a region of the connection electrode.

Optionally, the pixel electrode includes a trunk electrode and an orthogonal projection of the first through-hole on the pixel electrode is located at the trunk electrode.

Optionally, the trunk electrode includes a first trunk portion and a second trunk portion intersecting with and connected to the first trunk portion, the first trunk portion is parallel to the data line, and the second trunk portion is vertical to the data line; and
  the orthogonal projection of the first through-hole on the pixel electrode is located at one of the first trunk portion, the second trunk portion, and a connection portion of the first trunk portion and the second trunk portion.

Optionally, the connection electrode is located between two adjacent pixel electrodes.

Optionally, the common signal line includes a first common signal line and a second common signal line, the first common signal line and the second common signal line are vertically connected to each other, and the first common signal line is parallel to the data line; and
  the transparent shielding electrode is connected to the first common signal line via the first through-hole, and the second through-hole is located above the second common signal line.

Optionally, the first metal layer includes a scan line, and the second common signal line is parallel to the scan line.

Optionally, the transparent shielding electrode has a sheet shape, the transparent shielding electrode includes a first sub-electrode, and an orthographic projection of the first sub-electrode on the second metal layer covers the data line and the first sub-electrode is connected to the first common signal line via the first through-hole, and an orthographic projection of the first sub-electrode on the substrate covers an orthographic projection of the pixel electrode on the substrate.

Optionally, the transparent shielding electrode further includes a second sub-electrode extending form an end of the first sub-electrode;
  an orthographic projection of the second sub-electrode on the first metal layer covers part of the second common signal line; and
  the connection electrode is connected to the second sub-electrode via the second through-hole.

Optionally, the transparent shielding electrode includes a third sub-electrode, and an orthographic projection of the third sub-electrode on the second metal layer covers the data line, and at least part of an orthographic projection of the pixel electrode on the substrate is located between orthographic projections of two adjacent third sub-electrodes on the substrate.

Optionally, the transparent shielding electrode further includes a fourth sub-electrode and a fifth sub-electrode, and one or two of the fourth sub-electrode and the fifth sub-electrode are connected to the third sub-electrode;
  the fourth sub-electrode is connected to the first common signal line via the first through-hole, and
  the connection electrode is connected to the fifth sub-electrode via the second through-hole.

Optionally, the array substrate includes a pixel, the pixel includes a plurality of sub-pixels, and the first through-hole and the second through-hole are located in two different sub-pixels, respectively.

Optionally, the array substrate further includes a color filter disposed between the second metal layer and the shielding layer, the first through-hole goes through the color filter, the color filter is one of blue color filter, red color filter, and green color filter.

Optionally, an opening is defined in the pixel electrode, an orthographic projection of the first through-hole on the pixel electrode partially overlaps with the opening.

A display panel provided by the present application includes a color filter substrate and liquid crystals, the display panel further includes the array substrate abovementioned, and the liquid crystals are located between the color filter substrate and the array substrate.

BRIEF DESCRIPTION OF THE DRAWINGS

In order to more clearly illustrate the technical solution of embodiments of this application, a brief description of drawings that are necessary for the illustration of the embodiments of this application will be given as follows. Obviously, the drawings described below show only some embodiments of this disclosure, and a person having ordinary skill in the art may also obtain other drawings based on the drawings described without making any creative effort, herein.

DETAILED DESCRIPTION

Figure 1:
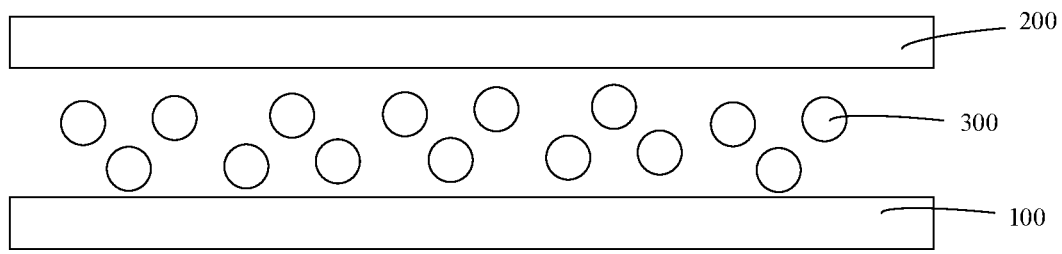
FIG. 1 is a cross-sectional view of a display panel provided by an embodiment of the present application.

The technical solutions of this application will be described clearly and completely below in combination with the drawings in the embodiments of this application. Obviously, the described embodiments are only part of the embodiments of this application, not all of them. A person having ordinary skill in the art may obtain other embodiments based on the embodiments provided in this application without making any creative effort, which all belong to the scope of the present disclosure.

In description of this application, it is to be understood that direction or position relationship indicated by terms "on", "up", "above", "down", "below" is based on direction or position relationship shown in the drawings, only for the convenience of describing this application and simplifying the description. It does not indicate or imply that the device or element referred to must have a specific orientation, be constructed and operated in a specific orientation, so it cannot be understood as a limitation of this application. Besides, the terms "first", "second" and "third" in the present application are used for descriptive purposes only, and cannot be understood as indicating or implying relative importance or implying numbers of indicated technical features. Thus, a feature defined as "first" and "second" may explicitly or implicitly includes one or more than one such features. In the description of this application, "a plurality of" means two or more than two, unless otherwise specified.

This application may repeat reference numbers and/or reference letters in different examples for the purpose of simplification and clarity, which does not indicate relationship between various embodiments and/or configurations discussed itself.

Detailed descriptions of the array substrate and the display panel provided in the present application is described in conjunction with specific embodiments and accompanying drawings.

Please refer to FIG. 1, a display panel 1000 is provided by an embodiment of the present application, the display panel 1000 includes an array substrate 100, a color filter substrate 200, and liquid crystals 300. The liquid crystals 300 are located between the color filter substrate 200 and the array substrate 100.

Figure 2:
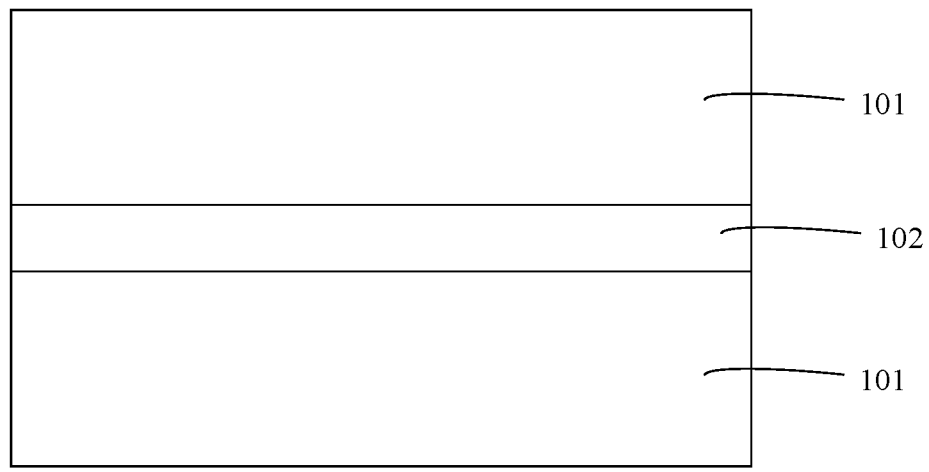
FIG. 2 is a structural schematic diagram of an array substrate of the display panel in FIG. 1.
Figure 3:
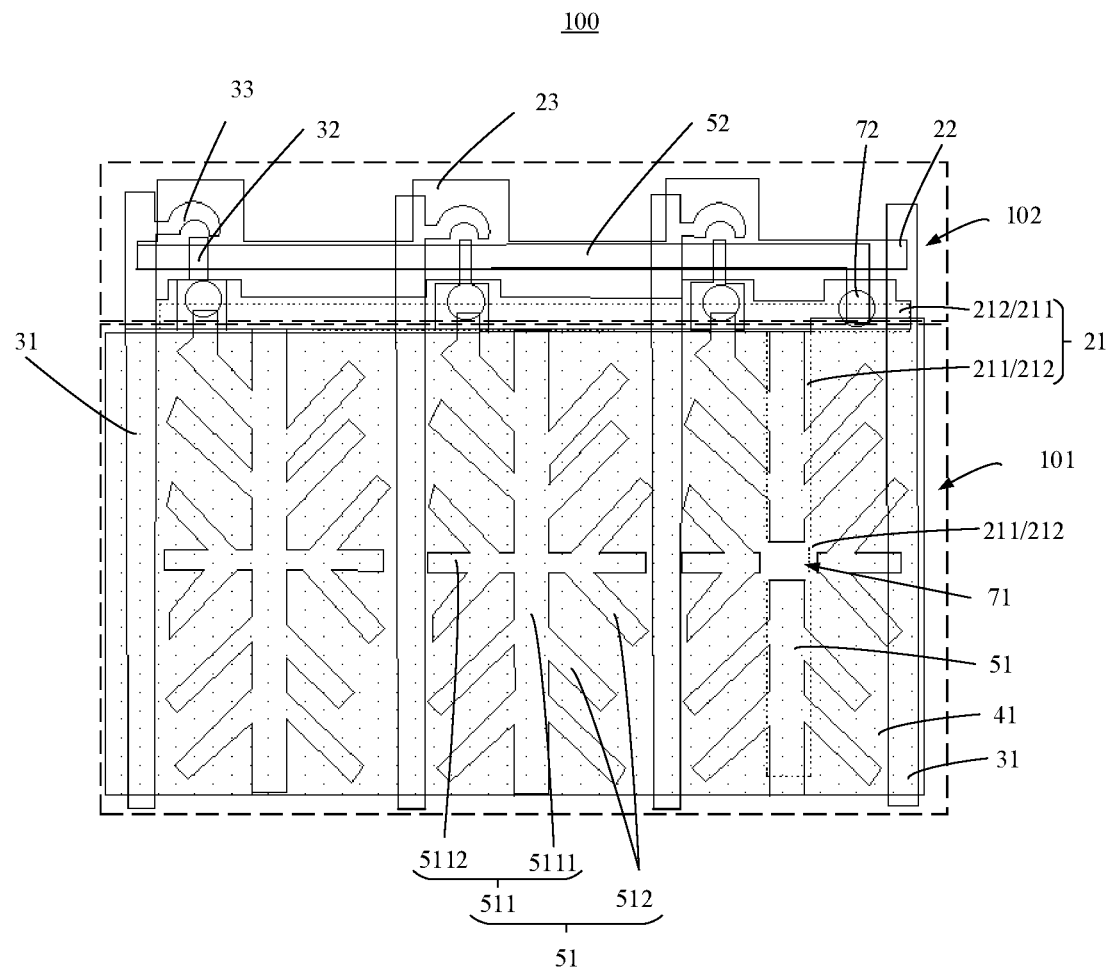
FIG. 3 is a plan view of a display region and a driving circuit region adjacent thereto of the array substrate in FIG. 2.

Please refer to FIG. 2 and FIG. 3, the array substrate 100 includes one or more pixel electrode regions 101 and one or more driving circuit regions 102. The driving circuit region 102 is located on one side of the pixel electrode region 101. In the embodiment, a number of the pixel electrode regions 101 is two or more than two, and each of the driving circuit regions 102 is located between two adjacent pixel electrode regions 101.

The array substrate 100 includes a plurality of sub-pixels, for example, red sub-pixels, green sub-pixels, and blue sub-pixels, etc. Each of the sub-pixels includes one pixel electrode.

Please refer to FIGS. 3 to 9, the array substrate 100 includes a substrate 10, a first metal layer 20, a second metal layer 30, an electrode layer 50, and a shielding layer 40. The first metal layer 20 is disposed on the substrate 10 and includes a plurality of common signal lines 21. The second metal layer 30 is disposed on a side of the first metal layer 20 facing away from the substrate 10, and includes a plurality of data lines 31. The electrode layer 50 is disposed on a side of the second metal layer 30 facing away from the first metal layer 20, and includes a plurality of pixel electrodes 51 and one or more connection electrodes 52 spaced from each other. The shielding layer 40 includes a plurality of transparent shielding electrodes 41. The shielding layer 40 is located between the second metal layer 30 and the electrode layer 50. Specifically, the transparent shielding electrodes 41 are located between the data lines 31 and the pixel electrodes 51. The transparent shielding electrodes 41 are connected to the common signal lines 21 via a plurality of first through-holes 71, the one or more connection electrodes 52 are connected to the transparent shielding electrodes 41 via one or more second through-holes 72. The first through-holes 71 and the second through-holes 72 are spaced from each other, in a plan view of the array substrate, the first through-hole 71 is located within a region of the pixel electrode 51 and the second through-hole 72 is located within a region of the connection electrode 52.

The first through-holes 71 and the second through-holes 72 are spaced from each other, in a plan view of the array substrate, the first through-hole 71 is located within a region of the pixel electrode 51 and the second through-hole 72 is located within a region of the connection electrode 52. Therefore, the first through-holes 71 are not communicated with the second through-holes 72, no undercut will be formed during the processes of communicating the first through-holes 71 with the second through-holes 72, and disconnection of the array substrate 100 and the display panel 1000 can be avoided.

Moreover, the first through-holes 71 and the second through-holes 72 are separated from each other, compared with the communicated deep hole and hallow hole, a distance between the first through-hole 71 and the second through-hole 72 can be adjusted based on need, and densities of the first through-holes 71 and the second through-holes 72 can be adjusted to increase the aperture ratio of the display panel 1000 without changing sizes of the holes, which improves display quality of the display panel 1000.

Moreover, one of the first through-holes 71 and the second through-holes 72 are defined in the pixel electrode region 101, and another one are defined in the driving circuit region 102. Compared with the situation that both the first through-holes 71 and the second through-holes 72 are defined in the driving circuit region 102, higher design freedom can be provided, and densities of the first through-holes 71 and the second through-holes 72 can be adjusted based on need for the arrangement of the first through-holes 71 and the second through-holes 72 in the present application.

Optionally, in another embodiment of the present application, the pixel electrode 51 is located in the pixel electrode region 101, the connection electrode 52 is located in the driving circuit region 102, and the connection electrode 52 is located between two adjacent pixel electrodes 51 in two adjacent pixel electrode regions 101. Each of the pixel electrode regions 101 is defined with one of the first through-holes 71, and the driving circuit region 102 is defined with the second through-holes 72.

Figure 4:
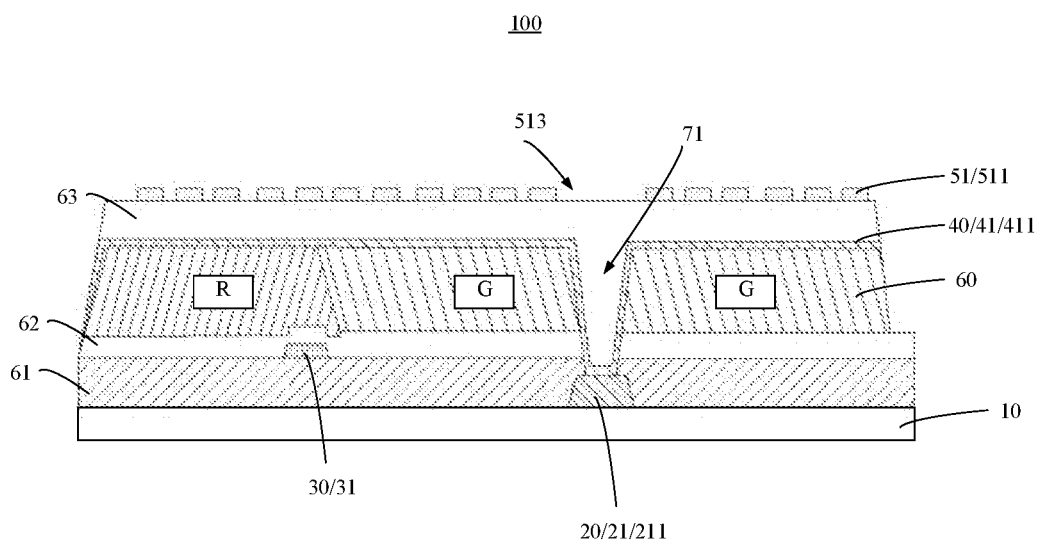
FIG. 4 is a cross-sectional view of the array substrate along a first through-hole shown in FIG. 3.
Figure 6:
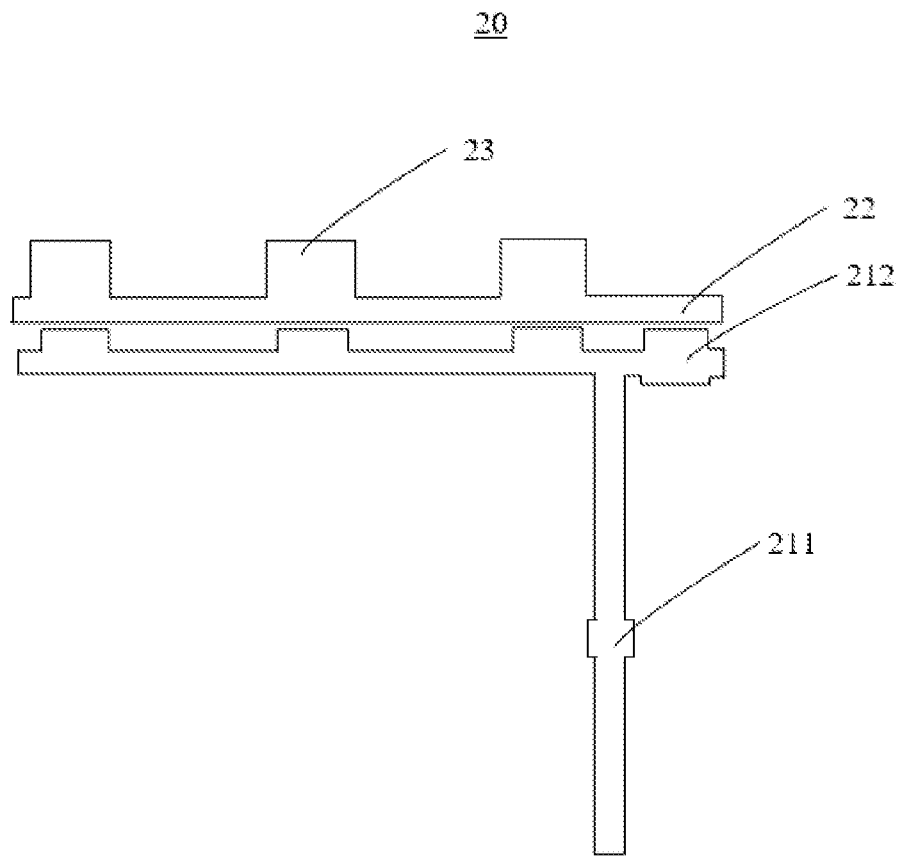
FIG. 6 is a plan view of the first metal layer shown in FIG. 3.

Please refer to FIGS. 3, 4 and 6, in the present application, the common signal line 21 includes a plurality of first common signal lines 211 and a plurality of second common signal lines 212. The first common signal lines 211 and the second common signal lines 212 are vertically connected to each other, and one of the first common signal lines 211 and the second common signal lines 212 are parallel to the data lines 31. The transparent shielding electrodes 41 are connected to one of the first common signal lines 211 and the second common signal lines 212 via the first through-holes 7, and the second through-holes are defined above the other one of the first common signal lines 211 and the second common signal lines 212.

In the embodiment, the first common signal lines 211 are parallel to the data lines 31. The transparent shielding electrodes 41 are connected to the first common signal lines 211 via the first through-holes 71, and the second through-holes 72 are defined above the second common signal lines 212.

Please refer to FIG. 3, the first metal layer 20 further includes a plurality of scan lines 22, and an extending direction of the scan lines 22 is vertical to an extending direction of the data lines 31. The second through-holes 72 are defined above the one of the first common signal lines 211 and the second common signal lines 212 which are parallel to the scan lines 22. In the embodiment, the second common signal lines 212 are parallel to the scan lines 22 and the second through-holes 72 are defined above the second common signal lines 212.

A region between two adjacent scan lines 22 and two adjacent data lines 31 defines one sub-pixel.

Figure 7:
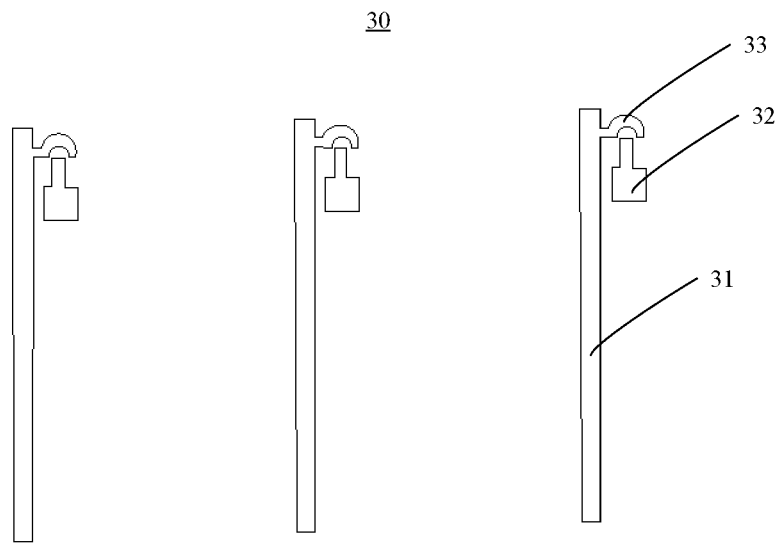
FIG. 7 is a plan view of the second metal layer shown in FIG. 3.

Please refer to FIGS. 3, 6 and 7, the first metal layer 20 further includes a plurality of gate electrodes 23 disposed in a same layer with the scan lines 22. The second metal layer 30 further includes a plurality of source electrodes 33 and a plurality of drain electrodes 32 disposed in a same layer with the data lines 31. The source electrodes 33 are connected to the data lines 31, the source electrodes 33 and the drain electrodes 32 are facing the gate electrodes 23. The array substrate 100 further includes a plurality of active layers (not shown in the figures) each disposed on one side of the gate electrodes 23. The array substrate 100 further includes a plurality of transistors, each of the transistors includes one gate electrode 23, one active layer, one source electrode 33, and one drain electrode 32 facing to each other relatively to the active layer. The pixel electrodes 51 are connected to the drain electrodes 32. Data signal is sequentially input to the source electrode 33, the drain electrode 32, and the pixel electrode 51 from the data line 31, while common signal is sequentially input to the connection electrode 52 and the transparent shielding electrode 41 from the common signal line 21.

Each of the pixel electrode regions 101 includes a plurality of pixel electrodes 51 and one connection electrode 52.

Please refer to FIGS. 3 and 8 again, each of the pixel electrodes 51 includes a trunk electrode 511 and a plurality of branch electrodes 512. A first end of the branch electrode 512 is connected to the trunk electrode 511, and a second end of the branch electrode 512 extends along a direction facing away from the trunk electrode 511 obliquely. Specifically, in the embodiment, the pixel electrode 51 has four domains. The trunk electrode 511 includes a first trunk portion 5111 and a second trunk portion 5112 intersecting with and connected thereto. The first ends of the branch electrodes 512a are connected to the first trunk portions 5111 and the second trunk portions 5112, and the second ends of the branch electrodes 512a extend along directions facing away from the first trunk portions 5111 and the second trunk portions 5112 obliquely. The first trunk portion 5111 and the second trunk portion 5112 are arranged in a cross shape. In other embodiments, the pixel electrode 51 is not limited to a four domains electrode, the pixel electrode 51 may be pixel electrode with domains of another number. A shape of the pixel electrode 51 is also not limited to the above-mentioned structure.

The first trunk portion 5111 is parallel to the data lines 31, and the second trunk portion 5112 is vertical to the data lines 31.

An orthographic projection of the first through-hole 71 on the pixel electrode 51 is located at the trunk electrode 511 of the pixel electrode 51, that is, the first through-hole 71 is facing the trunk electrode 511 of the pixel electrode 51. Therefore, the first through-hole 71 would not affect deflection of the liquid crystals 300 located above the brunch electrode 512 of the pixel electrode 51, and would not affect display quality of the display panel 1000.

The orthogonal projection of the first through-hole 71 on the pixel electrode 51 is located at one of the first trunk portion 5111, the second trunk portion 5112, and a connection portion of the first trunk portion 5111 and the second trunk portion 5112.

In the embodiment, please refer to FIG. 3, the orthogonal projection of the first through-hole 71 on the pixel electrode 51 is located at the connection portion of the first trunk portion 5111 and the second trunk portion 5112.

Please refer to FIG. 4, an opening 513 is provided in each of the pixel electrodes 51. The orthogonal projection of the first through-hole 71 on the pixel electrode 51 partially overlaps with the opening 513.

Figure 5:
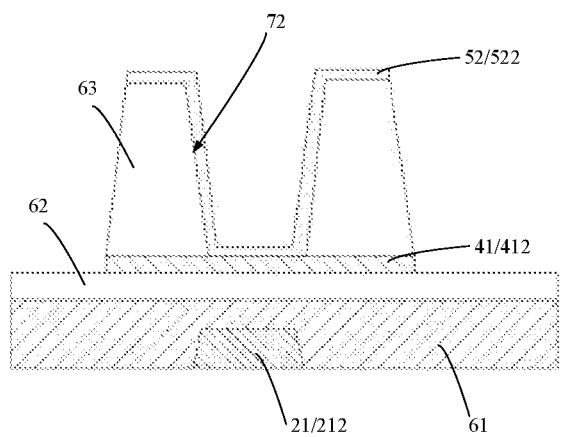
FIG. 5 is a cross-sectional view of the array substrate along a second through-hole shown in FIG. 3.
Figure 8:
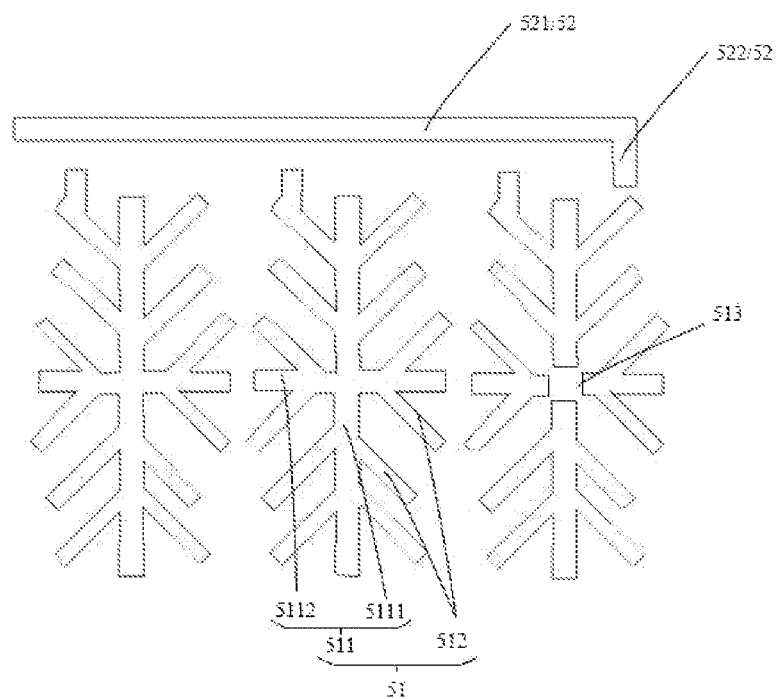
FIG. 8 is a plan view of the electrode layer shown in FIG. 3.

Please refer to FIGS. 3, 5 and 8, the connection electrode 52 includes a first connection portion 521 and a second connection portion 522 vertically connected thereto. An extending direction of the first connection portion 521 is the same as the extending direction of the scan lines 22, and an extending direction of the second connection electrode 522 is the same as the extending direction of the data lines 31. The second connection portion 522 is connected to the transparent shielding electrode 41 via the second through-hole 72.

The pixel electrode 51 and the connection electrode 52 are both transparent. Materials of both of the pixel electrode 51 and the connection electrode 52 are indium tin oxide (ITO). Certainly, the materials of the pixel electrode 51 and the connection electrode 52 are not limited to ITO, and may also be other transparent materials.

Figure 9:
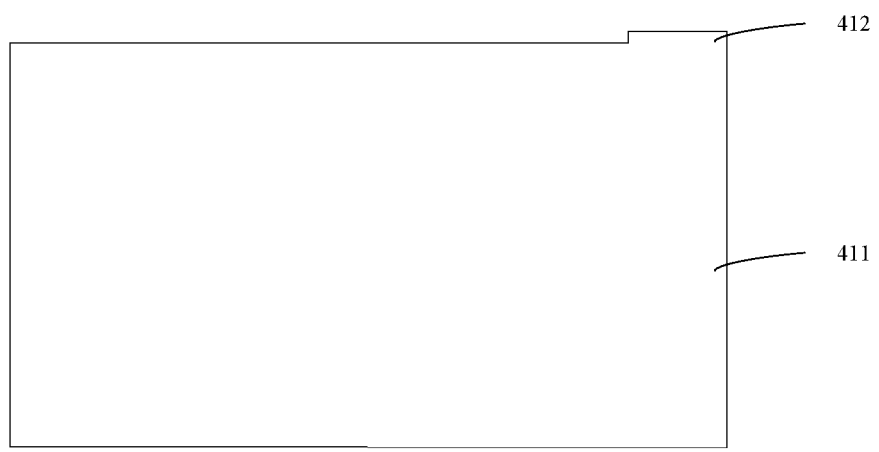
FIG. 9 is a plan view of the shielding layer shown in FIG. 3.

Please refer to FIGS. 3, 5 and 9, the transparent shielding electrode 41 has a sheet shape. The transparent shielding electrode 41 includes a first sub-electrode 411 and a second sub-electrode 412 extending form an end of the first sub-electrode 411. An orthographic projection of the first sub-electrode 411 on the second metal layer 30 covers the data line 31 and the first sub-electrode 411 is connected to the first common signal line 211 via the first through-hole 71, and an orthographic projection of the first sub-electrode 51 on the substrate 10 is located at an orthographic projection of the pixel electrode 51 on the substrate 10. The orthographic projection of the first sub-electrode 51 on the substrate 10 covers the orthographic projection of the pixel electrode 51 on the substrate 10. An orthographic projection of the second transparent shielding electrode 412 on the first metal layer 20 covers part of the second common signal line 212, and the connection electrode 52 is connected to the second sub-electrode 412 via the second through-hole 72.

Specifically, the second connection portion 522 of the connection electrode 52 is connected to the second sub-electrode 42 via the second through-hole 72.

Please refer to FIG. 4, the array substrate 100 further includes a plurality of color filters 60 disposed between the second metal layer 30 and the shielding layer 40, each of the first through-holes 71 goes through one of the color filters 60.

Optionally, in one of the embodiments of the present application, the color filters 60 are blue color filters, red color filers, and green color filters. And the first through-holes 71 go through the blue color filters. Transmittance of the blue color filters is relatively low, the first through-holes 71 go through the blue color filters, so that the transmittance of the blue color filters is increased, thus optimizing aperture ration.

Certainly, the first through-holes 71 may go through other color filters, for example, the red color filters or the green color filters, depending on actual situation.

Please refer to FIGS. 4 and 5, optionally, in other embodiments, the array substrate 100 further includes a first insulating layer 61, a planarization layer 62, and a second insulating layer 63. The first insulating layer 61 covers the first metal layer 20, the planarization layer 62 covers the second metal layer 30, the color filters 60 are disposed on the planarization layer 62, the second insulating layer 63 is disposed on the shielding layer 40, the electrode layer 50 is disposed on the second insulating layer 63. The first through-holes 71 go through the color filters 60, the planarization layer 62, and the first insulating layer 61. The second through-holes 62 go through the second insulating layer 63.

Please refer to FIG. 3, optionally, in other embodiments of the present application, in the plan view, the first through-hole 71 and the second through-hole 72 are located within a region of a same pixel. For example, the first through-hole 71 and the second through-hole 72 are located in one of the blue sub-pixels, the red sub-pixels, and the green sub-pixels.

Figure 10:
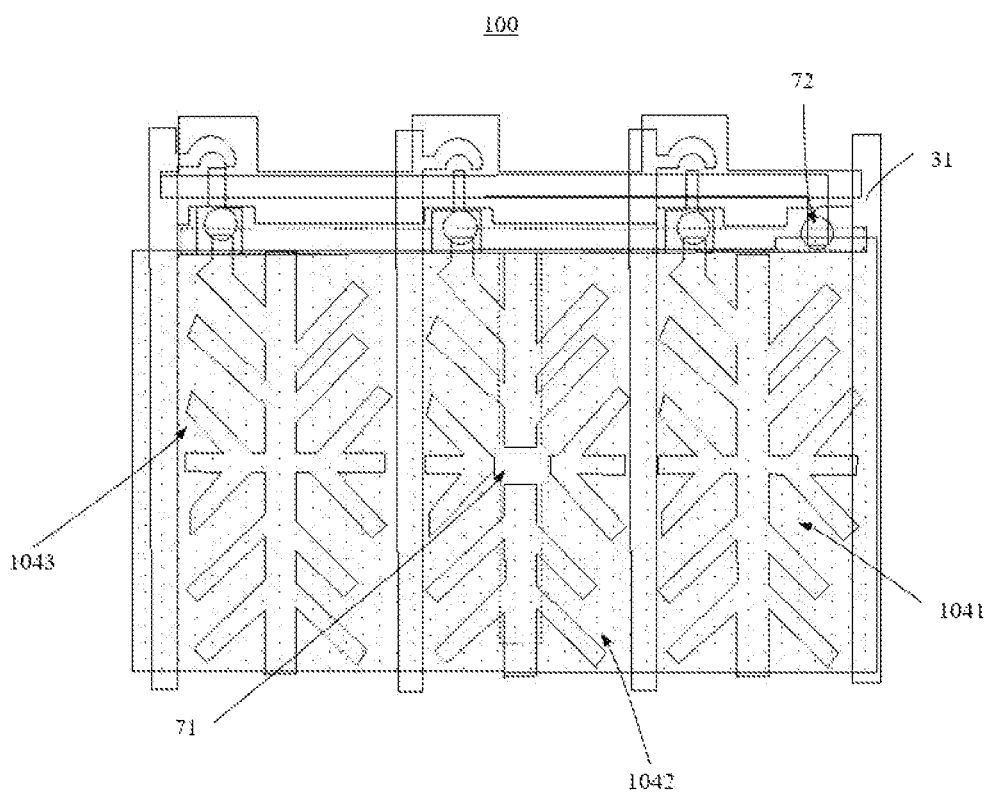
FIG. 10 is a structural schematic diagram of an array substrate provided by another embodiment of the present application.

Please refer to FIG. 10, optionally, in other embodiments of the present application, the first through-hole 71 and the second through-hole 72 are located within regions of two different pixels. Specifically, the first through-hole 71 and the second through-hole 72 are located within regions of two adjacent pixels, respectively, or regions of two pixels which are not adjacent to each other, respectively. Specifically, densities of the first through-holes 71 and the second through-holes 72 can be adjusted according to actual situation.

The color filter substrate 200 includes a second substrate (not shown), patterned black matrices (not shown) disposed on the second substrate, and a common electrode disposed on the second substrate and covering the black matrices. The common electrode faces the pixel electrodes 51.

Figure 11:
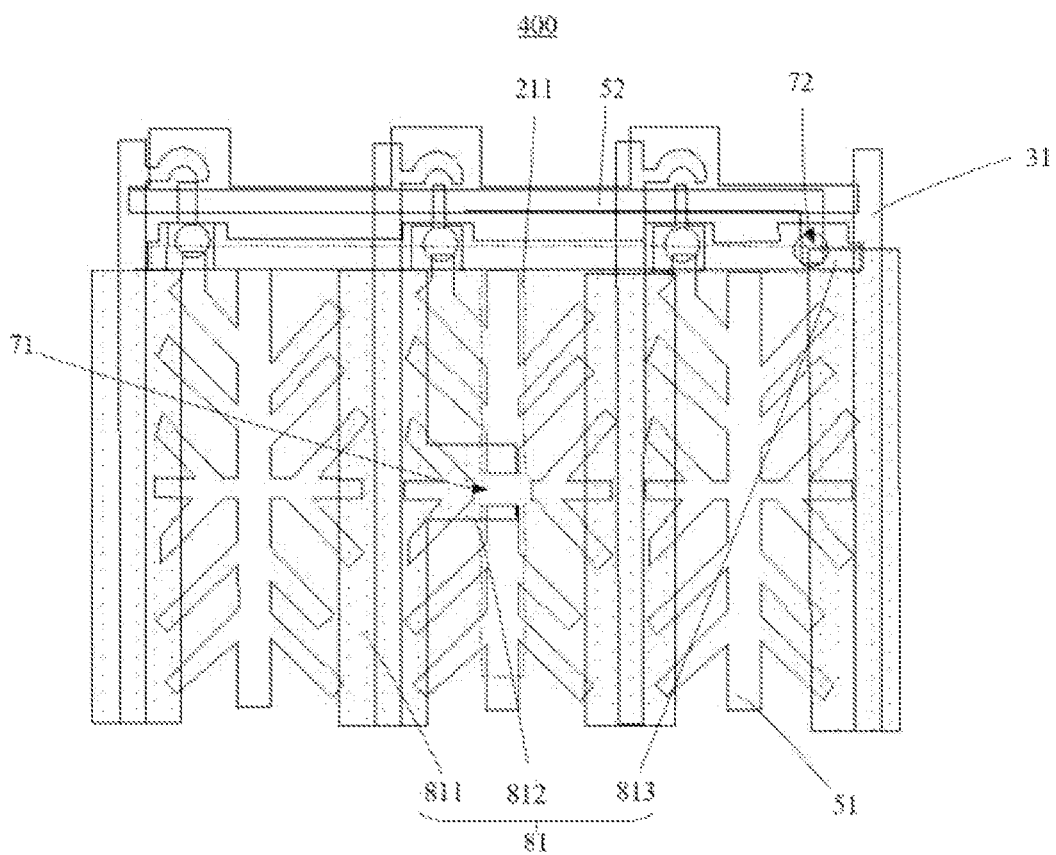
FIG. 11 is a structural schematic diagram of an array substrate provided by yet another embodiment of the present application.

Please refer to FIGS. 11 and 4, an array substrate 400 is provided by another embodiment of the present application, difference between the structure of the array substrate 400 and the array substrate 100 lies in that: the transparent shielding electrode 81 of the array substrate 400 includes a plurality of third sub-electrodes 811, and an orthographic projection of each of the third sub-electrodes on the second metal layer 30 covers one of the data lines 31, and at least part of an orthographic projection of one of the pixel electrodes 51 on the substrate 10 is located between orthographic projections of two adjacent third sub-electrodes 811 on the substrate 10. In the embodiment, each of the third sub-electrodes 811 further covers part of the pixel electrode 51. In other embodiment, the orthographic projection of one of the pixel electrodes 51 on the substrate 10 is located between orthographic projections of two adjacent third sub-electrodes 811 on the substrate 10.

Each of the transparent shielding electrodes 81 further includes a fourth sub-electrode 812 and a fifth sub-electrode 813, and one or two of the fourth sub-electrode 812 and the fifth sub-electrode 813 are connected to the third sub-electrode 811. The fourth sub-electrode 812 is connected to the first common signal line 211 via the first through-hole 71, and the connection electrode 52 is connected to the fifth sub-electrode 813 via the second through-hole 72.

According to the array substrate, the opening 513 is defined in a portion of the transparent shielding electrode 81 which is not facing the data lines 31, the orthographic projection of the transparent shielding electrode 81 on the second metal layer covers the data line 31, or covers the data line 31 and part of the pixel electrode 51, which reduces loading of the display panel 1000 and improves charging rate.

According to the array substrate and the display panel, the first through-hole and the second through-hole are not communicated with each other, instead, the first through-hole and the second through-hole are spaced from each other, and in the plan view of the array substrate, the first through-hole is located within the region of the pixel electrode, and the second through-hole is located within the region of the connection electrode. Therefore, the first through-hole and the second through-hole are not communicated to each other, no undercut will be formed during the processes of communicating the first through-holes with the second through-holes, and disconnection of the array substrate and the display panel can be avoided.

Moreover, the first through-holes and the second through-holes are separated from each other, compared with the communicated deep hole and hallow hole, a distance between the first through-hole and the second through-hole can be adjusted based on need, and densities of the first through-holes and the second through-holes can be adjusted to increase the aperture ratio of the display panel without changing sizes of the holes, which improves display quality of the display panel.

Moreover, one of the first through-holes and the second through-holes are defined in the pixel electrode region, and another one of the first through-holes and the second through-holes is defined in the driving circuit region. Compared with the situation that both the first through-holes and the second through-holes are defined in the driving circuit region, higher design freedom can be provided, and densities of the first through-holes and the second through-holes can be adjusted based on need for the arrangement of the first through-holes and the second through-holes of the present application.

The orthographic projection of the first through-hole on the pixel electrode is located at the trunk electrode of the pixel electrode, that is, the first through-hole is facing the trunk electrode of the pixel electrode. Therefore, the first through-hole would not affect deflection of the liquid crystals located above the brunch electrode of the pixel electrode, and would not affect display quality of the display panel.

Moreover, according to the array substrate, the opening is defined in the portion of the transparent shielding electrode which is not facing the data line, the orthographic projection of the transparent shielding electrode on the second metal layer covers the data line, or covers the data line and part of the pixel electrode, which reduces the loading of the display panel and improves charging rate.

In conclusion, although the application has been disclosed as above in the preferred embodiments, the above preferred embodiments are not used to limit the application. A person having ordinary skill in the art can make various changes and refinements within the spirit and scope of the application. Therefore, the protection scope of the application is subject to the scope defined in the claims.

What is claimed is:

1. An array substrate, comprising:
    a substrate;
    a first metal layer disposed on the substrate and comprising a common signal line;
    a second metal layer disposed on a side of the first metal layer facing away from the substrate and comprising a data line;
    an electrode layer disposed on a side of the second metal layer facing away from the first metal layer and comprising a pixel electrode and a connection electrode spaced from each other; and
    a shielding layer located between the second metal layer and the electrode layer and comprising a transparent shielding electrode;
    wherein the transparent shielding electrode is connected to the common signal line via a first through-hole, the connection electrode is connected to the transparent shielding electrode via a second through-hole, the first through-hole and the second through-hole are spaced from each other, in a plan view of the array substrate, the first through-hole is located within a region of the pixel electrode and the second through-hole is located within a region of the connection electrode.

2. The array substrate according to claim 1, wherein the pixel electrode comprises a trunk electrode, and an orthogonal projection of the first through-hole on the pixel electrode is located at the trunk electrode.

3. The array substrate according to claim 2, wherein the trunk electrode comprises a first trunk portion and a second trunk portion intersecting with and connected to the first trunk portion, the first trunk portion is parallel to the data line, and the second trunk portion is vertical to the data line; and
    the orthogonal projection of the first through-hole on the pixel electrode is located at one of the first trunk portion, the second trunk portion, and a connection portion of the first trunk portion and the second trunk portion.

4. The array substrate according to claim 1, wherein the connection electrode is located between two adjacent pixel electrodes.

5. The array substrate according to claim 1, wherein the common signal line comprises a first common signal line and a second common signal line, the first common signal line and the second common signal line are vertically connected to each other, and the first common signal line is parallel to the data line; and
    the transparent shielding electrode is connected to the first common signal line via the first through-hole, and the second through-hole is located above the second common signal line.

6. The array substrate according to claim 5, wherein the first metal layer further comprises a scan line, and the second common signal line is parallel to the scan line.

7. The array substrate according to claim 6, wherein the transparent shielding electrode has a sheet shape, the transparent shielding electrode comprises a first sub-electrode, and an orthographic projection of the first sub-electrode on the second metal layer covers the data line and the first sub-electrode is connected to the first common signal line via the first through-hole, and the orthographic projection of the first sub-electrode on the substrate covers an orthographic projection of the pixel electrode on the substrate.

8. The array substrate according to claim 7, wherein the transparent shielding electrode further comprises a second sub-electrode extending from an end of the first sub-electrode;
    an orthographic projection of the second sub-electrode on the first metal layer covers part of the second common signal line; and
    the connection electrode is connected to the second sub-electrode via the second through-hole.

9. The array substrate according to claim 6, wherein the transparent shielding electrode comprises a third sub-electrode, and an orthographic projection of the third sub-electrode on the second metal layer covers the data line, and at least part of an orthographic projection of the pixel electrode on the substrate is located between orthographic projections of two adjacent third sub-electrodes on the substrate.

10. The array substrate according to claim 9, wherein the transparent shielding electrode further comprises a fourth sub-electrode and a fifth sub-electrode, and one or two of the fourth sub-electrode and the fifth sub-electrode are connected to the third sub-electrode;
    the fourth sub-electrode is connected to the first common signal line via the first through-hole, and
    the connection electrode is connected to the fifth sub-electrode via the second through-hole.

11. The array substrate according to claim 1, wherein the array substrate comprises a pixel, the pixel comprises a plurality of sub-pixels, and the first through-hole and the second through-hole are located in two different sub-pixels, respectively.

12. The array substrate according to claim 1, wherein the array substrate further comprises a color filter disposed between the second metal layer and the shielding layer, the first through-hole goes through the color filter, the color filter is one of blue color filter, red color filter, and green color filter.

13. The array substrate according to claim 1, wherein an opening is defined in the pixel electrode, an orthographic projection of the first through-hole on the pixel electrode partially overlaps with the opening.

14. A display panel, comprising a color filter substrate and liquid crystals, wherein the display panel further comprises the array substrate according to claim 1, and the liquid crystals are located between the color filter substrate and the array substrate.

15. The display panel according to claim 14, wherein the pixel electrode comprises a trunk electrode, and an orthogonal projection of the first through-hole on the pixel electrode is located at the trunk electrode.

16. The display panel according to claim 15, wherein the trunk electrode comprises a first trunk portion and a second trunk portion intersecting with and connected to the first trunk portion, the first trunk portion is parallel to the data line, and the second trunk portion is vertical to the data line; and the orthogonal projection of the first through-hole on the pixel electrode is located at one of the first trunk portion, the second trunk portion, and a connection portion of the first trunk portion and the second trunk portion.

17. The display panel according to claim 14, wherein the connection electrode is located between two adjacent pixel electrodes.

18. The display panel according to claim 14, wherein the common signal line comprises a first common signal line and a second common signal line, the first common signal line and the second common signal line are vertically connected to each other, and the first common signal line is parallel to the data line; and the transparent shielding electrode is connected to the first common signal line via the first through-hole, and the second through-hole is located above the second common signal line.

19. The display panel according to claim 18, wherein the first metal layer further comprises a scan line, and the second common signal line is parallel to the scan line.

20. The display panel according to claim 19, wherein the transparent shielding electrode has a sheet shape, the transparent shielding electrode comprises a first sub-electrode, and an orthographic projection of the first sub-electrode on the second metal layer covers the data line and the first sub-electrode is connected to the first common signal line via the first through-hole, and the orthographic projection of the first sub-electrode on the substrate covers an orthographic projection of the pixel electrode on the substrate.

* * * * *